Dec. 19, 1961  E. E. REED ET AL  3,013,819
COUPLING APPARATUS
Filed May 10, 1957  4 Sheets-Sheet 1

INVENTORS
E.E. REED
A.F. DYER
BY
*Hudson and Young*
ATTORNEYS

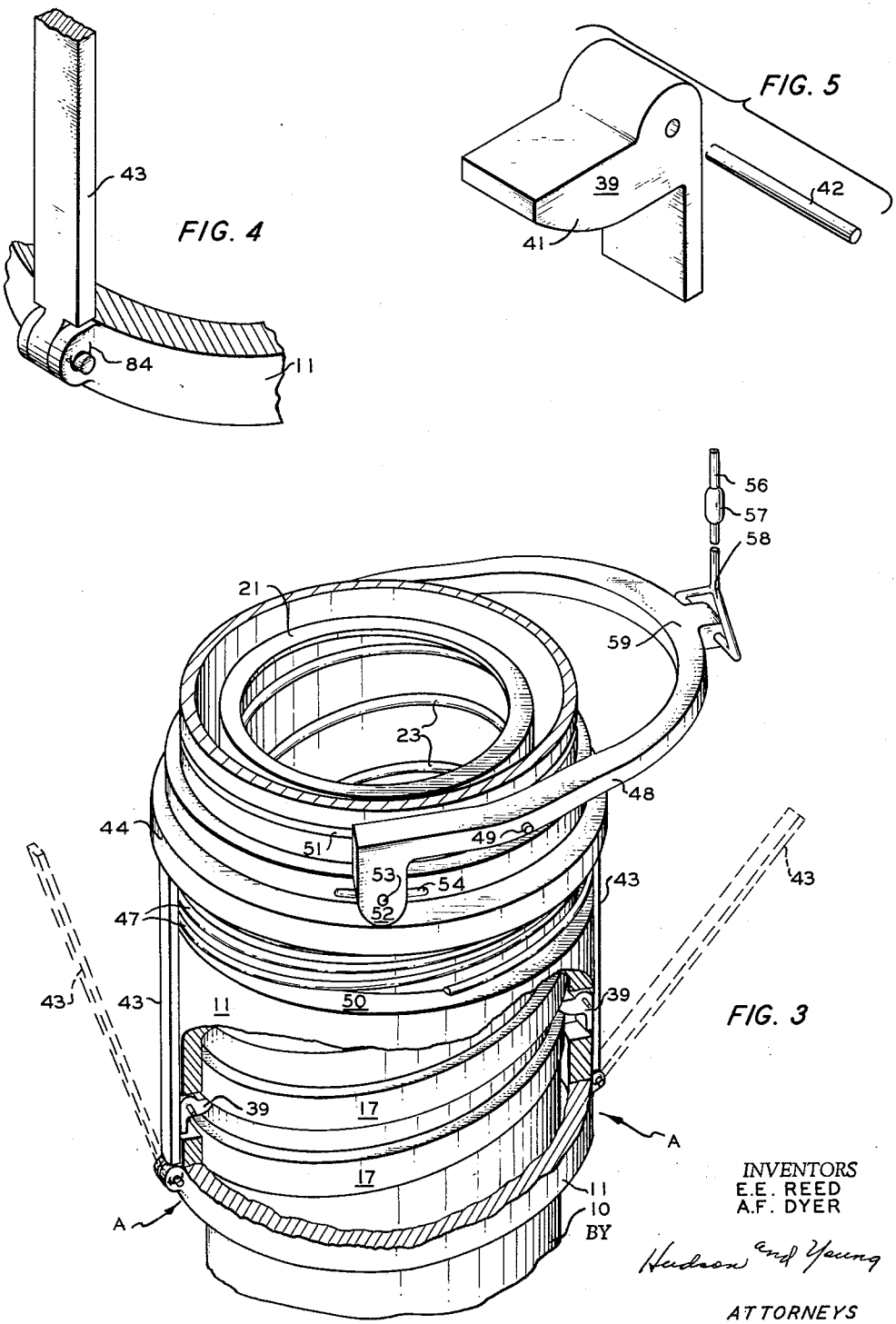

Dec. 19, 1961 E. E. REED ET AL 3,013,819
COUPLING APPARATUS

Filed May 10, 1957 4 Sheets-Sheet 3

INVENTORS
E.E. REED
A.F. DYER

BY

*Hudson and Young*

ATTORNEYS

Dec. 19, 1961 E. E. REED ET AL 3,013,819
COUPLING APPARATUS

Filed May 10, 1957 4 Sheets-Sheet 4

INVENTORS
E.E. REED
A.F. DYER
BY Hudson and Young

ATTORNEYS

United States Patent Office 3,013,819
Patented Dec. 19, 1961

3,013,819
COUPLING APPARATUS
Edwin E. Reed and Alvah F. Dyer, Bartlesville, Okla., assignors to Phillips Petroleum Company, a corporation of Delaware
Filed May 10, 1957, Ser. No. 658,301
12 Claims. (Cl. 284—18)

This invention relates to coupling apparatus. In one aspect this invention relates to coupling apparatus adapted for quick release from a remote position. In another aspect this invention relates to quick release coupling apparatus provided with means under tension adapted to release the coupling means when said tension is released.

It has long been a problem in connecting conduits to provide an automatic coupling which will operate without loss of the material being transported through said conduits and which can be quickly uncoupled from a remote position in the event of an emergency. Such an apparatus is especially desirable in handling highly inflammable, corrosive, or valuable fluids. With such fluids the dangers or possible economic loss involved are obvious. For example, inflammable hydrocarbons are one class of materials which must be handled in as safe a manner as possible.

At the present time, there is a trend to replace the familiar aircraft servicing tank truck with a fueling system comprising underground conduits supplying fuel from a central storage and pumping facility to a plurality of fuel hydrants located at parking stations on the air field. In such a fueling system small mobile servicing trucks having metering and filtering means thereon, and provided with suitable connections which connect with said hydrants and the aircraft, are employed at said parking stations. The fuel is delivered from the hydrant through the metering and filtering means on the service truck and into the aircraft. In most instances both the truck conduit connecting to the hydrant, and the hydrant outlet itself, are provided with valves which close automatically when said truck conduit and said hydrant are separated. However, the separation of the truck conduit from the hydrant must be effected manually.

Although the servicing truck is generally provided with emergency shut-down means it is desirable that means be provided to shut-off flow of fuel at the hydrant conduit outlet under certain emergency conditions. This could be accomplished if means were provided to automatically and/or quickly separate the truck conduit from the hydrant conduit and thus allow the automatic valves present in said conduits to close. The present invention provides such a coupling apparatus which is adapted for quick release from a remote position in the event of an emergency.

An object of the invention is to provide an improved coupling apparatus. Another object of the invention is to provide a coupling apparatus which is adapted for quick release from a remote position in the event of an emergency. Still another object of the invention is to provide quick release coupling apparatus provided with means under tension adapted to release the coupling means when said tension is released. Still another object of the invention is to provide coupling apparatus adapted for quick release and which is further adapted to automatically close the coupling conduits prior to separation, and wherein said coupling conduits must be connected prior to permitting flow therethrough. Other aspects, objects, and advantages of the invention will be apparent to those skilled in the art in view of this disclosure.

Thus, according to the invention, there is provided a coupling apparatus adapted for quick release from a remote position which comprises, in combination: separable first and second conduits, said first conduit being adapted to be inserted into said second conduit; means for coupling said conduits together; and means under tension adapted to release said coupling means when said tension is released.

FIGURE 3 is a perspective view showing details of the coupling means of the embodiment of the invention illustrated in FIGURE 1.

FIGURE 4 is a detail of part of the apparatus illustrated in FIGURES 1, 2, and 3.

FIGURE 5 is a detail of another part of the apparatus illustrated in FIGURES 1, 2, and 3.

Figures 1, 2:
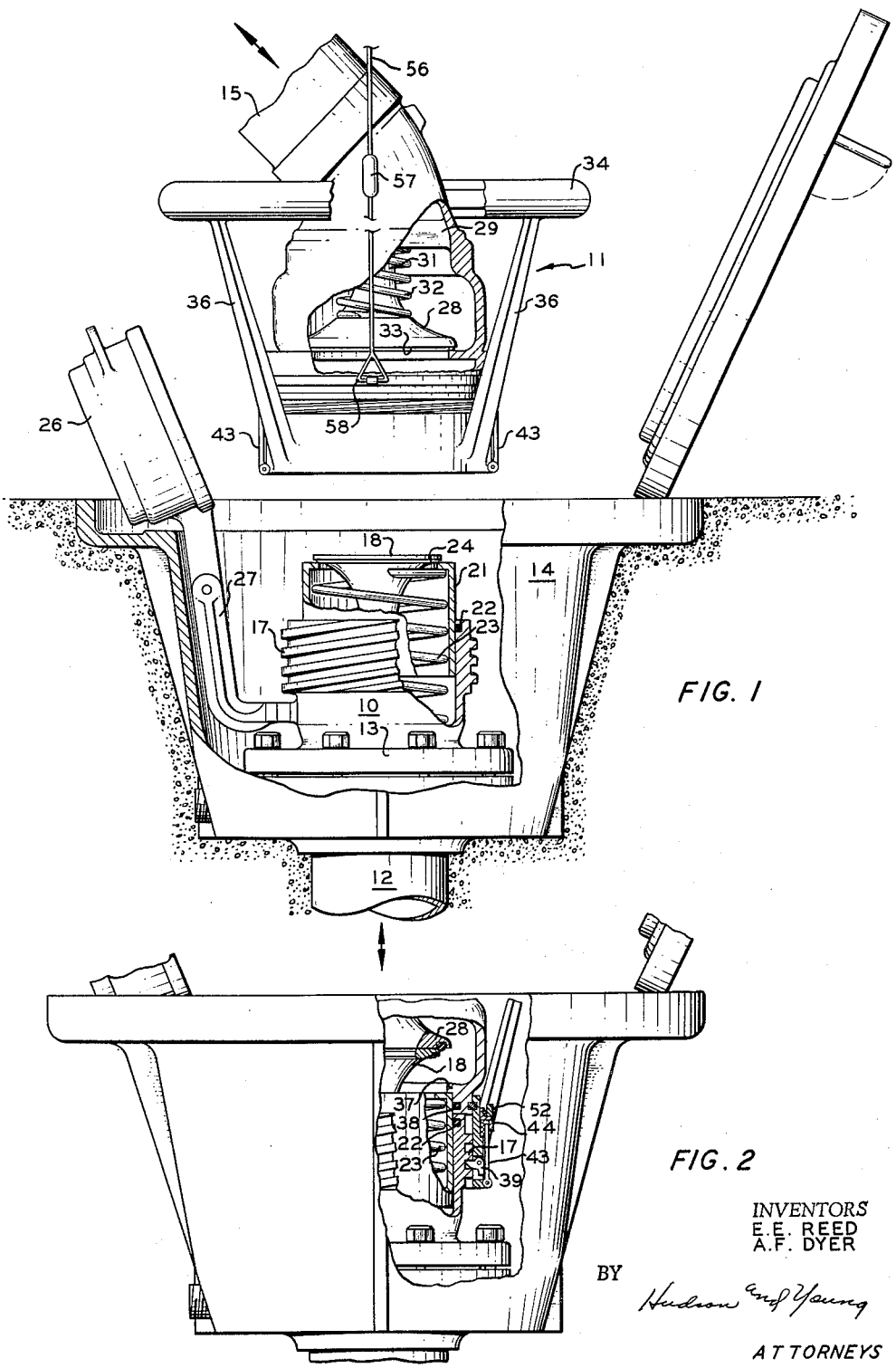
FIGURE 1 is an elevation, partly in section, illustrating one embodiment of the apparatus of the invention when the two conduits or valve bodies to be coupled together are separated.
FIGURE 2 is a partial view in cross section showing the relation between the two conduits or valve bodies of FIGURE 1 when said conduits or valve bodies are coupled together.
Figure 7:
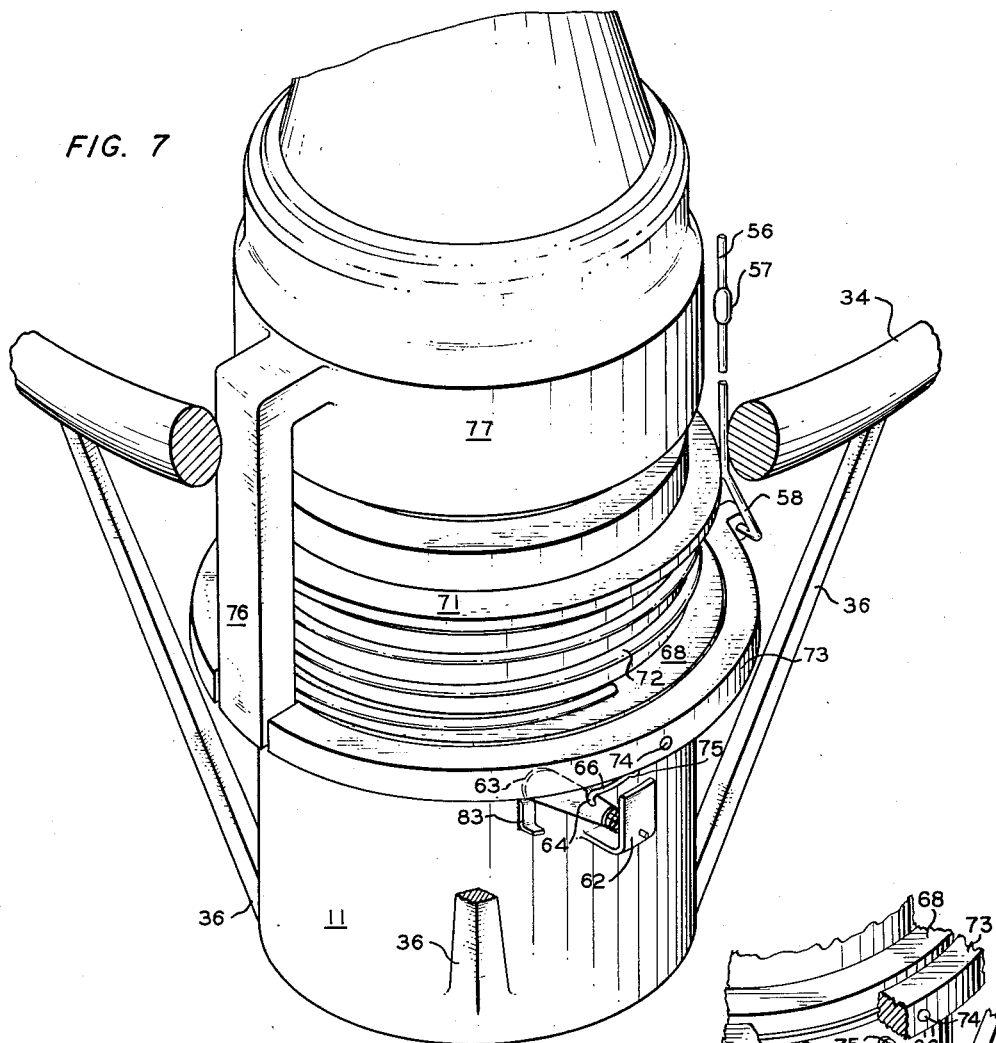
FIGURE 7 is a perspective view of another embodiment of the apparatus of the invention.
Figure 8:
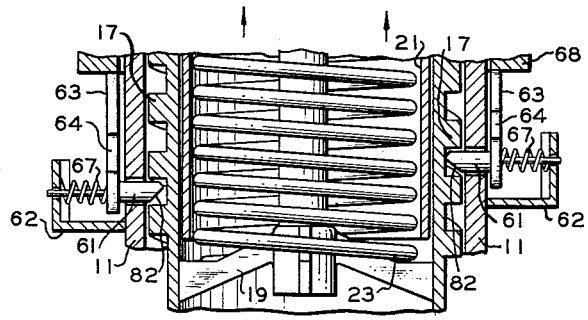
FIGURE 8 is an elevation, partially in cross section, illustrating one modification of the coupling means of the embodiment of the invention illustrated in FIGURE 7.

Referring now to the drawings wherein like reference numerals are employed to denote like elements, the invention will be more fully explained. FIGURES 1–6 illustrate one embodiment of the apparatus of the invention. In FIGURE 1 reference numerals 10 and 11 designate first and second conduits or valve bodies, respectively. The elements 10 and 11 are referred to herein as conduits or valve bodies because, as will be obvious from the explanation which is given hereinafter, the invention is applicable to conduits which are not provided with valve means therein as well as to conduits having valve means therein as illustrated. However, for convenience, the terms "valve body" and "valve bodies" will be employed throughout the remainder of this description. First valve body 10 is connected to a pipe line 12 by means of a flange 13 as shown and pipe line 12 is in turn connected to a source of fuel supply. Said first valve body 10 is usually positioned in a housing or fill box 14 which is located below the surface of the air field. Threads 17 are provided on the outer wall of said first valve body 10. Said threads are preferably a square thread as shown. A first poppet valve 18 is mounted within said valve body 10. Said poppet valve is fixed within said valve body by means of cross members 19 (FIGURE 8). A sleeve 21 is slidably mounted within said first valve body with O-ring, or packing means 22 providing a seal between said sliding sleeve and the inner wall of valve body 10. In closed position, i.e., when said valve body 10 is not coupled together with said second valve body 11, sleeve 21 is normally biased by means of spring 23 into seating engagement at 24 with poppet valve 18. A dust cover 26, hinged to arm 27, is provided to cover valve body 10 when said valve body is not in use.

Second valve body 11 is provided with a second poppet valve 28 mounted therein by means of cross arm 29. The stem 31 of valve 28 is slidably mounted in cross arm 29. Spring 32, acting against arm 29, biases valve 28 to a closed position at seat 33 when the valve body 11 is not coupled together with valve body 10. Operating wheel 34, connected to said second valve body 11 by means of spokes 36, is provided for screwing said second valve body 11 onto said first valve body 10 as described further hereinafter. Internal shoulder 37 (see FIGURE 2) engages sliding sleeve 21 and forces said sleeve downward to open poppet valve 18 when said second valve body 11 is screwed onto said first valve body 10 as described hereinafter. O-ring or packing 38 provides a seal between said second valve body 11 and said sleeve 21.

A pair of lugs 39 having a lower cam surface 41 (see FIGURES 3 and 5) are pivotally mounted in openings provided in opposite sides of the wall of second valve body 11 by means of pins 42. Said lugs 39 extend through said openings and engage threads 17 which are provided on the outer surface of valve body 10. A pair of lever members 43 are pivotally connected at one end to the outer wall of valve body 11. Said lever members extend across said openings and longitudinally along the outer wall of said second valve body and are thus adapted to hold said lugs 39 into engagement with threads 17 provided on the outer wall of first valve body 10. A ring member 44 surrounds said second valve body 11 at a point above said openings in the wall thereof. Said ring member 44 has a vertically extending portion 44a which is in sliding contact with the outer wall of valve body 11, a horizontally extending portion 44b which extends outwardly from said vertical portion, and a second vertical portion 44c which extends downwardly from said horizontal portion 44b to thus form a pocket 46. (See FIGURE 6.) Said ring member 44 is thus adapted to engage the extended ends of said lever members 43 which extend into said pocket 46. A spring 47, resting on a ledge 50 provided in the outer wall of valve body 11, surrounds said valve body and bears against ring member 44 so as to bias said ring member 44 in an upwardly direction out of engagement with said lever members 43. A yoke 48 is pivotally mounted by means of pin 49 on the outer wall of valve body 11. Said pin 49 extends slidably into groove 51 and thus provides for valve body 11 to be rotated without rotating yoke 48. The ends 52 of said yoke are rounded and are adapted to bear against said ring member 44. Said ends 52 are pivotally connected to said ring member 44 by means of pins 53 which extends slidably into slots 54 in said ring member 44. Said yoke 48 is thus adapted to apply force or tension to ring member 44. Said force or tension is supplied by applying tension to cable 56, having fusible link 57 therein, attached to handle 58 which in turn is attached to the bow portion 59 of said yoke 48. Operating wheel 34 and supporting spokes 36 attached thereto have been omitted from FIGURE 3 for simplicity. As is evident from FIGURE 1 said spokes would be attached to valve body 11 at the points A in said FIGURE 3.

Figure 11:
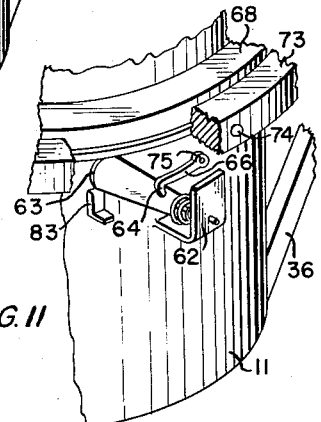
FIGURE 11 is a detail of part of the apparatus illustrated in FIGURE 7.
Figure 6:
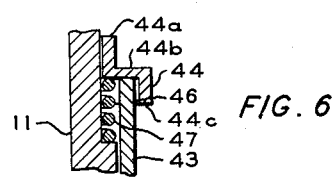
FIGURE 6 is a detail of still another part of the apparatus illustrated in FIGURES 1, 2, and 3.

In the second embodiment of the invention illustrated in FIGURES 7-10, the first valve body 10 is exactly the same as the first valve body 10 shown in FIGURES 1-6. A pair of rotatable lugs 61 (more clearly shown in FIGURES 8 and 9) are mounted in brackets 62 attached on opposite sides to the outer wall of second valve body 11. One end of each of said lugs extends through openings provided in said wall of said valve body 11 adjacent said brackets, and are adapted to engage threads 17 provided on said first valve body 10. The other end of each of said lugs is provided with a cam arm 63 having a recess 64 therein. A spring clip 66 (see FIGURES 7 and 11) is pivotally connected to valve body 11 at 75 and is provided to engage said recess 64 and hold said cam arm 63 in a semi-upwardly extending position when the inner ends of said lugs 61 are engaged with threads 17 on valve body 10. Springs 67 are provided to normally bias said lugs into engagement with said threads 17.

A movable ring member 68 having a groove 69 (see FIGURE 9) in the outer periphery thereof surrounds valve body 11 at a point above the ends of cam arms 63. A fixed ring member 71, spaced apart from, and above said movable ring member 68 is attached to and surrounds valve body 11. A spring 72 is positioned between said ring members 68 and 71 and surrounds said valve body 11. Said spring is adapted to bear against said fixed ring member 71 and thus bias said movable ring member 68 downwardly into striking engagement with the rounded upper ends of said cam arms 63. A yoke ring 73 surrounds and is pivotally connected to said movable ring member 68 by means of pin 74 which extends into groove 69 on said movable ring member 68. The ends of said yoke ring 73 are pivotally connected to a bar member 76 which in turn is connected to the upper portion 77 of said valve body 11. A cable 56 having a fusible link 57 therein is attached to handle 58 which is attached to bow portion 59 of said yoke ring 73.

Figure 9:
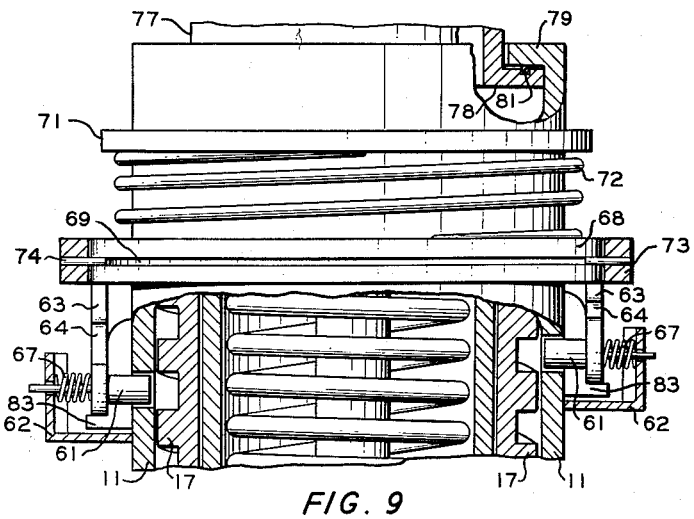
FIGURE 9 is an elevation, partially in cross section, illustrating another modification of the coupling means of the apparatus illustrated in FIGURE 7.
Figure 10:
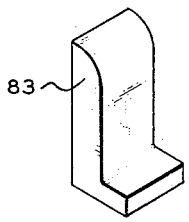
FIGURE 10 is a detail of part of the apparatus illustrated in FIGURES 7 and 9.

In this embodiment of the invention the outer wall of the valve body 11 can be conveniently fabricated in two portions as shown more clearly in FIGURE 9. The upper portion 77 of said valve body is provided with an outwardly extending horizontal lip 78 which engages a corresponding inwardly extending lip 79 on the lower portion of said valve body 11. O-ring or other packing means 81 provides a seal between the two portions of valve body 11. This two-portion construction of said valve body 11 is provided to conveniently provide means for connecting yoke ring 73 to said valve body so that said valve body can be rotated, without said yoke ring rotating, when said valve body 11 is screwed onto valve body 10.

In the modification illustrated in FIGURE 8, the ends of lugs 61 which engage threads 17 are provided with a cam surface 82 which aids in rotating said lugs out of engagement with said threads. Ring 68 rotates lugs 61 until cam surface 82 is in contact with threads 17 at which time the action between cam surfaces 82 and threads 17 forces lugs 61 outward.

In the modification illustrated in FIGURE 9, a cam member 83 is attached to the outer wall of said valve body 11 adjacent said brackets 62 and below each of said cam arms 63. Said cam members 83 are adapted to coact with said cam arms 63 and disengage said lugs 61 from threads 17. If desired a set of cam members 83 can be employed in the modification illustrated in FIGURE 8 to aid in disengaging lugs 61 from threads 17.

In the operation of the embodiment of the invention illustrated in FIGURES 1-6, upper valve body 11 is assembled with lugs 39 extending through the provided openings in the wall of said valve body. Lever members 43 are placed into position extending across said openings to hold said lugs 39 in extended position in engagement with threads 17. The upper or extended ends of said lever members 43 are placed in pocket 46 behind and under ring member 44 and tension is applied to hold said lever members 43 in the position just described. Said tension is provided by pulling upwardly on cable 56 which causes the ends 52 of yoke 48 to bear against and bias ring member 44 in a downwardly direction. Said cable 56 can be fastened to any convenient means on conduit 15 or the servicing truck so as to maintain said tension. Second valve body 11 is then threaded into connection with first valve body 10 with lugs 39 engaging threads 17. As valve body 11 is threaded onto valve body 10, shoulder 37 in valve body 11 engages sliding sleeve 21 in valve body 10, forces same downwardly, and thus opens poppet valve 18. At the same time, poppet valve 18 engages the lower surface of poppet valve 28 in valve body 11 and forces said poppet valve 28 upwardly from its valve seat 33 and thus opens said valve 28. Sealing means 22 and 38 which engage sliding sleeve 21, as shown, provided a fluid tight connection between said valve body 11 and said valve body 10.

With the valve bodies thus coupled, if the operator for any reason wishes to close valves 18 and 28 and uncouple said valve bodies, he can release the tension on cable 56 which will allow yoke 48 to pivot at the point 49 and raise the ends 52 of said yoke. This action will permit ring member 44 to be moved upwardly by the force of compressed spring 47, thus releasing levers 43 which will fall outwardly as shown by the dotted lines in FIGURE 3. When levers 43 are thus released, lugs 39 are released and will pivot downwardly out of engagement with threads 17. If desired, springs 84 (see FIGURE 4) can be provided to aid in causing lever members 43 to fall in an outward direction when ring member 44 moves upwardly. When lugs 39 pivot out of engagement with threads 17, the force of springs 23 and 32 immediately causes said valve bodies to separate and valves 18 and 28 are immediately closed. The apparatus is actuated similarly when heat separates one of the fusible links 57 provided in cable 56. Thus, for example, if cable 56 is fastened so as to maintain tension on yoke 48, and the operator happens to be absent from the apparatus when a fire breaks out in the vicinity of the coupling, the heat will cause said fusible link to part and thus release the tension, which would actuate the apparatus as previously described.

It will be noted that the apparatus of the invention would fail in a safe manner. That is, if for any reason there should be a failure of any part of the apparatus which holds lever members 43 in position across lugs 39, said lugs 39 would immediately come out of engagement with threads 17, causing the valve bodies to be uncoupled, and the valve means therein to be closed.

In the embodiment of the invention illustrated in FIGURES 7–10 the operation is similar to that described for the embodiment of the invention illustrated in FIGures 1–6. Second valve body 11 is assembled with cam lugs 61 extending into engagement with threads 17 as shown in FIGURE 8. Spring clip 66 is placed in engaging position with recess 64 (see FIGURES 7 and 11) to hold said cam arms 63 in an upwardly extending position. Tension is applied to cable 56 so as to hold movable ring member 68 in an upwardly position out of engagement with the ends of cam arms 63. Said cable 56 can be fastened as previously described to maintain said tension. Valve body 11 is then threaded onto valve body 10, as previously described, with lugs 61 engaging threads 17. With the valve bodies thus coupled together, if the operator wishes to uncouple said valve bodies he releases the tension on said cable 56 which will allow yoke ring 73 and movable ring member 68 to move downwardly and strike cam arms 63. When ring member 68 strikes said cam arms 63, lugs 61 will be rotated out of engagement with threads 17, and force of springs 23 and 32 will cause said valve bodies to become uncoupled, and valves 18 and 28 will automatically close. The apparatus is actuated similarly when heat separates one of the fusible links 57 in cable 56 as previously described in connection with the other embodiment of the invention.

The coupling apparatus of the invention has been described as being employed in connection with an aircraft fueling system. It will be realized by those skilled in the art that said coupling apparatus is adapted for many other uses. For example, said coupling apparatus can be employed for coupling sections of separable pipe lines. Said coupling apparatus can also be employed for connecting tank cars and tank trucks for loading and unloading purposes, and on other types of containers and transporting means, as will be understood by those skilled in the art. It is not essential, although it is usually highly desirable, that the conduits which are to be coupled together are provided with valving means for closing said conduits when they are uncoupled. For example, a biasing means of force similar to that provided by springs 23 and 32 in the apparatus illustrated could be provided to furnish the force which tends to cause the conduits to separate to an uncoupled position. Said biasing means does not necessarily have to be coiled around a poppet valve, or employed in combination with valve means, as illustrated herein. It is also within the scope of the invention to employ other suitable means which would tend to cause the coupled conduits to become uncoupled when tension on the coupling means is released.

As will be evident to those skilled in the art in view of the above disclosure, various other modifications of the invention can be made, or followed, without departing from the spirit or scope of the invention.

We claim:

1. Coupling apparatus adapted for quick release from a remote position which comprises, in combination: separable first and second conduits, said first conduit being adapted to be coupled into connection with said second conduit; first engaging means provided on the outer wall of said first conduit; second engaging means carried by said second conduit and adapted to engage said first engaging means when said conduits are coupled together; means within each of said conduits tending to separate same when said conduits are coupled together; and means under tension adapted, when said tension is released, to release said second engaging means from engagement with said first engaging means and thereby uncouple said conduits.

2. Coupling apparatus adapted for quick release from a remote position which comprises, in combination: separable first and second conduits, said first conduit being adapted to be inserted into said second conduit; means for coupling said conduits together; means within each of said conduits tending to separate same when said conduits are coupled together; and means under tension adapted to release said coupling means when said tension is released.

3. Coupling apparatus adapted for quick release from a remote position which comprises, in combination: separable first and second conduits, said first conduit being adapted to be inserted into said second conduit; threads provided on the outer wall of said first conduit; lug means carried by said second conduit, extending through the wall thereof, and adapted to engage said threads when said conduits are coupled; means for holding said lug means in engagement with said threads; means within each of said conduits tending to separate same when said conduits are coupled together; and means under tension adapted to release said holding means, when said tension is released, and cause said lug means to disengage said threads and thereby uncouple said conduits.

4. Coupling apparatus adapted for quick release from a remote position which comprises, in combination: separable first and second conduits, said first conduit being adapted to be inserted into said second conduit; threads provided on the outer wall of said first conduit; lug means carried by said second conduit and extending through the wall of said second conduit into engagement with said threads; means for holding said lug means in engagement with said threads; means within each of said conduits tending to separate same when said conduits are coupled together; and means under tension adapted to cause said holding means, when said tension is released, to permit said lug means to disengage said threads and thereby uncouple said conduits.

5. Coupling apparatus adapted for quick release from a remote position which comprises, in combination: separable first and second conduits, said first conduit being adapted to be inserted into said second conduit; threads provided on the outer wall of said first conduit; lug means carried by said second conduit, extending through the wall thereof, and adapted to engage said threads; means within each of said conduits tending to separate same when said conduits are coupled together; and means under tension for holding said lug means in engagement with said threads, said last mentioned means being adapted, when said tension is released, to permit said lugs to disengage said threads and thereby uncouple said conduits.

6. Coupling apparatus adapted for quick release from a remote position which comprises, in combination: separable first and second conduits, said first conduit being adapted to be inserted into said second conduit; threads provided on the outer wall of said first conduit, rotating lug means carried by said second conduit and extending through the wall of said second conduit into engagement with said threads on said first conduit; means within each of said conduits tending to separate same when said conduits are coupled together; and means under tension adapted to cause said lugs, when tension is released, to rotate and disengage said threads and thereby uncouple said conduits.

7. Coupling apparatus adapted for quick release from a remote position which comprises, in combination: separable first and second conduits, said first conduit being adapted to be inserted into said second conduit; threads provided on the outer wall of said first conduit; lug means carried by said second conduit and extending through the wall of said second conduit into engagement with said threads; lever means under tension for holding said lug means in engagement with said threads; means within each of said conduits tending to separate same when said conduits are coupled together; and means under tension for holding said lever means in contact with said lugs, said last mentioned means being adapted, when said tension is released, to permit said lever means to come out of contact with said lugs whereupon said lugs disengage said threads and said conduits are uncoupled.

8. Coupling apparatus adapted for quick release from a remote position which comprises, in combination: separable first and second conduits, said first conduit being adapted to be inserted into said second conduit; threads provided on the outer wall of said first conduit; a pair of lugs pivotally mounted in openings provided in opposite sides of the wall of said second conduit, said lugs being adapted to extend through said openings and engage said threads when said conduits are coupled together; a pair of elongated lever members pivotally connected at one end to the outer wall of said second conduit below said openings, said lever members normally extending across said openings and along the outer wall of said second conduit when said conduits are coupled together to thereby hold said lugs in engagement with said threads; a ring member surrounding said second conduit and adapted to normally engage the extended ends of said lever members; a spring surrounding said second conduit below said ring member and adapted to bias said ring member upwardly out of engagement with said lever members; a yoke pivotally connected to and partially surrounding said second conduit above said ring member, the ends of said yoke being pivotally connected to and adapted to bear on said ring member; means within each of said conduits tending to separate same when said conduits are coupled together; and means attached to the bow of said yoke for applying tension to hold the ends of said yoke into contact with said ring member and thereby prevent said ring member from disengaging said extended ends of said lever members and uncoupling said conduits.

9. Coupling apparatus adapted for quick release from a remote position which comprises, in combination: separable first and second conduits, said first conduit being adapted to be inserted into said second conduit; threads provided on the outer wall of said first conduit; rotating lug means carried by said second conduit and extending through the wall of said second conduit into engagement with said threads on said first conduit, said lug means being provided with cam arms on the outer ends thereof; spring means for biasing said lug means into engagement with said threads when said conduits are coupled together; means within each of said conduits tending to separate same when said conduits are coupled together; and means under tension adapted to coact with said cam arms, when said tension is released, and rotate said lug means out of engagement with said threads and thereby uncouple said conduits.

10. Coupling apparatus adapted for quick release from a remote position which comprises, in combination: separable first and second conduits, said first conduit being adapted to be inserted into said second conduit; threads provided on the outer wall of said first conduit; a pair of rotatable lugs mounted in brackets provided on opposite sides of the outer wall of said second conduit, one end of each of said lugs extending through openings provided in said wall of said second conduit adjacent said brackets and adapted to engage said threads when said conduits are coupled together, and the other end of each of said lugs being provided with a cam arm; spring means for biasing said lugs into engagement with said threads; spring clip means adapted to coact with a recess in each of said cam arms and hold said cam arms in an upward position; a movable ring member surrounding said second conduit above the ends of said cam arms; a fixed ring member spaced apart from and above said movable ring member, surrounding, and attached to said second conduit; a spring surrounding said second conduit between said ring members, said spring being adapted to bear against said fixed ring member and to bias said movable ring member downwardly into engagement with said cam arms; a yoke ring surrounding and pivotally connected to said movable ring member, the ends of said yoke ring being pivotally connected to said second conduit; means within each of said conduits tending to separate same when said conduits are coupled together; and means attached to the bow of said yoke for applying tension in an upwardly direction to prevent said movable ring member from bearing on said cam arms and thereby rotate said lug means out of engagement with said threads and uncoupling said conduits.

11. The apparatus of claim 9 wherein the ends of said lugs which are adapted to engage said threads are provided with cam surfaces.

12. The apparatus of claim 9 wherein a cam member is attached to the outer wall of said second conduit adjacent each of said brackets and below each of said cam arms, said cam members being adapted to coact with said cam arms and aid in disengaging said lugs from said threads when said movable ring member strikes said cam arms.

References Cited in the file of this patent

UNITED STATES PATENTS

| | | |
|---|---|---|
| 137,823 | Button | Apr. 15, 1873 |
| 426,824 | Leland | Apr. 29, 1890 |
| 2,648,553 | Ulrich | Aug. 11, 1953 |
| 2,819,914 | Eitner | Jan. 14, 1958 |
| 2,854,259 | Clark | Sept. 30, 1958 |
| 2,946,605 | Mosher | July 26, 1960 |